United States Patent
Lam et al.

(10) Patent No.: US 6,814,500 B2
(45) Date of Patent: Nov. 9, 2004

(54) OPTICAL INTERFACE UTILIZING POLYMER ASSISTED STRAIN RELIEF

(75) Inventors: Yee Loy Lam, Singapore (SG); Kian Hin Victor Teo, Singapore (SG); Poh Lin Chong, Singapore (SG)

(73) Assignee: Denselight Semiconductor PTE Ltd., Changi (SG)

( * ) Notice: Subject to any disclaimer, the term of this patent is extended or adjusted under 35 U.S.C. 154(b) by 127 days.

(21) Appl. No.: 10/305,742

(22) Filed: Nov. 27, 2002

(65) Prior Publication Data
US 2003/0133673 A1 Jul. 17, 2003

(30) Foreign Application Priority Data
Nov. 29, 2001 (GB) .............................. 0128619

(51) Int. Cl.[7] ................................ G02B 6/42
(52) U.S. Cl. ...................... 385/86; 385/147
(58) Field of Search ................ 385/86–90, 100, 385/147; 439/447, 576, 344

(56) References Cited

U.S. PATENT DOCUMENTS

| | | | |
|---|---|---|---|
| 5,199,095 A | 3/1993 | Iapicco | |
| 5,889,910 A | * 3/1999 | Igl et al. | 385/100 |
| 6,431,904 B1 | * 8/2002 | Berelsman | 439/447 |
| 2003/0133673 A1 | * 7/2003 | Lam et al. | 385/88 |

FOREIGN PATENT DOCUMENTS

WO       WO 99/05553        2/1999

* cited by examiner

Primary Examiner—Akm Enayet Ullah
(74) Attorney, Agent, or Firm—Buckley, Maschoff & Talwalkar LLC

(57) ABSTRACT

Disclosed is a strain relief interface for connecting a packaged optical device and an optical fibre. The optical fibre passes through a snout bore extending from a side wall of the package. The interface comprises two moulded jackets. The first moulded jacket surrounds, and is affixed to, a sheathed section of optical fibre from which a fibre jacket has been removed. A first end of the first moulded jacket is affixed to a fibre jacket that encases an adjacent section of optical fibre. A second end of the first moulded jacket is affixed to the snout bore and to a ferrule located within the snout bore. The second moulded jacket surrounds, and is affixed to, the first moulded jacket, a portion of the fibre jacket and the snout bore.

Also disclosed is a method for fabricating a strain relief interface.

19 Claims, 1 Drawing Sheet

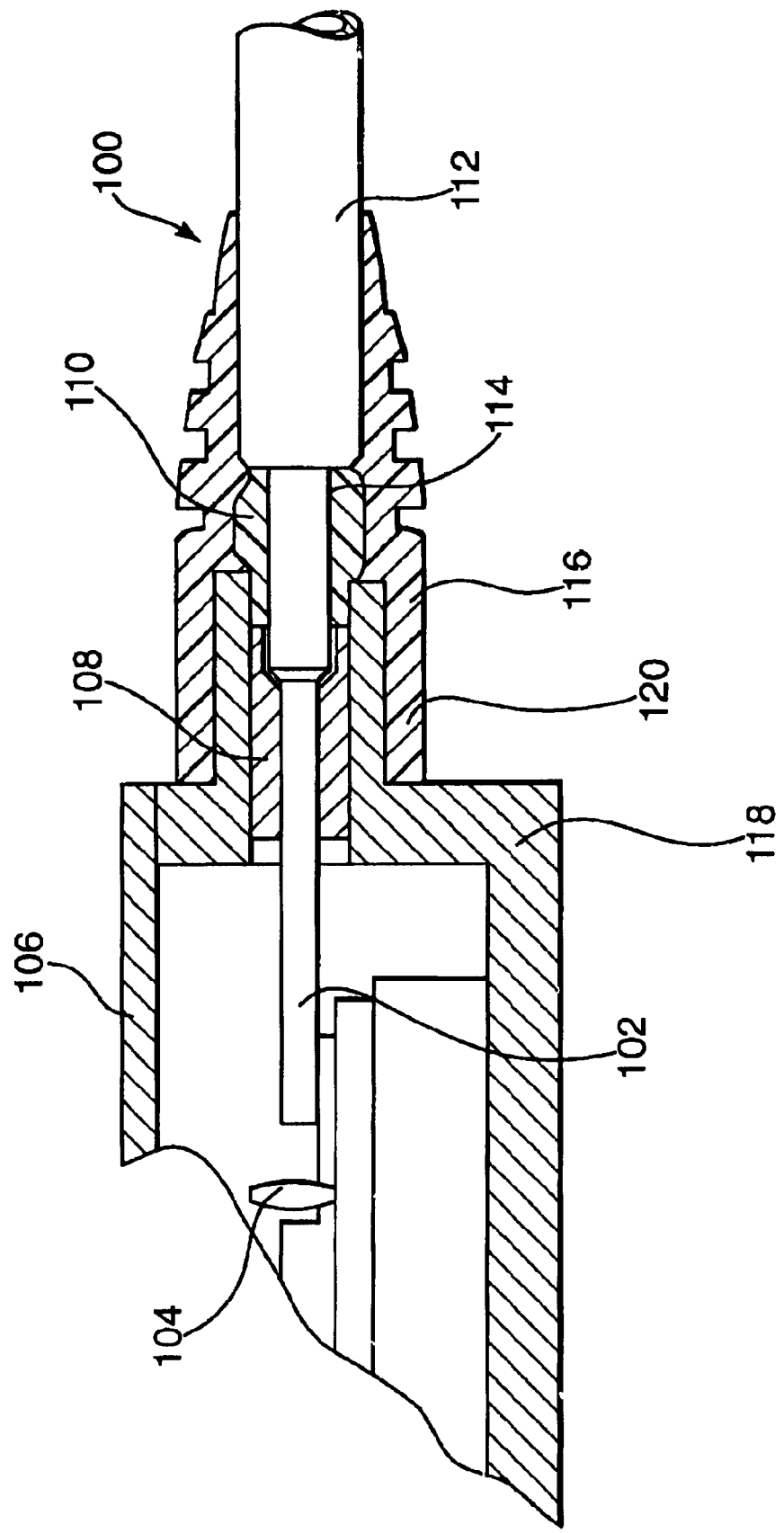

OPTICAL INTERFACE UTILIZING POLYMER ASSISTED STRAIN RELIEF

This application is a U.S. National filing under 35 U.S.C. §119 hereby claiming priority to GB Application No. 0128619.4, filed Nov. 29, 2001, the contents of which are incorporated herein by reference for all purposes.

INTRODUCTION

The present invention relates to the provision of an interface between an optical fibre and an optical source. In particular, the invention relates to a method of manufacture of a fibre-to-butterfly-casing interface that utilises polymer assisted strain relief.

The proliferation of laser diodes in the areas of optical networking, medical and spectroscopic instruments have placed greater demands on the way laser diodes are packaged and interfaced to fibre. The trends in delivering laser light into fibres for more efficient connectivity will put cost of packaging as the primary consideration for packaging laser diodes. Current methods of laser fibre interface demand that the fibres be fixed to the laser diodes' emitter facets by a compliant clip restraining V groove. These methods will fix the end tip of an optical fibre to a sub-mount or substrate near the laser diode. In the scheme of packaging, the fibre has to be interfaced to a package casing, commonly designed as a "butterfly" package. The fibre is constructed with a ferrule interface, which is gold plated and pre-coated with solder. The butterfly casing interface wall has a snout with a concentric hole bored to fit the ferrules on the fibre. Upon assembly, the ferrules are soldered to the casing wall and snout bore by applying a series of solder joint seals. At the exit of the snout bore, thick epoxy is applied to the fibre to cover the external fibre ferrule to the harness, cladding overlay and fibre cladding. A rubberized sleeve is pulled over the epoxy and fibre harness before the epoxy is cured. This rubberized sleeve forms the initial part of the stiffness measure to prevent stress point fibre failure at the snout interface. A rubber boot is then pulled over the rubber sleeve as a final assembly to complete the device interface. The boot, together with the rubber sleeve, constitutes the full strain relief in the interface design. The boot helps maintain a minimum bend radius when forces are applied at the connector and distributes strain forces to the connector housing instead of the fibre.

This method of butterfly casing interfacing requires fibres and ferrules that are very expensive. The epoxy joints and sleeve processes are very messy, curing times are relatively long, and the curing process often leads to non-uniform stress formation. There is a need to reduce cost of component, cost of assembly, and to reduce failures due to stresses induced during assembly.

Strain relief in electrical wire plugs and connectors has typically been achieved using moulded polymer materials. Fibre optic interfaces are however more fragile and making conventional moulding techniques undesirable. Furthermore, sealing and hermetic proofing requirements have also discouraged the use of moulded polymer interfaces.

In accordance with the present invention, there is provided a strain relief interface for connecting a packaged optical device and an optical fibre, the optical fibre passing through a snout bore extending from a side wall of the package, comprising: a first moulded jacket, said first moulded jacket surrounding and affixed to a sheathed section of optical fibre from which a fibre jacket has been removed, a first end of the first moulded jacket affixed to a fibre jacket encasing an adjacent section of optical fibre, a second end of the first moulded jacket affixed to the snout bore and to a ferrule located within the snout bore; and a second moulded jacket, said second moulded jacket surrounding and affixed to the first moulded jacket, a portion of the fibre jacket, and the snout bore.

The strain relief interface of the invention has a reduced part count and assembly time when compared to prior art strain relief interfaces.

The first moulded jacket may comprise a quick-curing epoxy compound. The epoxy compound preferably has a similar coefficient of thermal expansion to the optical fibre.

Advantageously, the second moulded jacket comprises a thermoplastic elastomer.

An outer surface of the second moulded jacket may be ridged to provide strain relief.

The strain relief interface may further comprise a rubber boot pulled over the second moulded jacket.

The packaged optical device is preferably a butterfly packaged optical device.

In accordance with a further aspect of the present invention, there is provided a method for fabricating a strain relief interface that connects a packaged optical device and an optical fibre, the optical fibre passing through a snout bore extending from a side wall of the package, comprising the steps of:

locating over a bezel a sheathed section of optical fibre adjacent the snout bore, said sheathed section comprising a portion stripped of a fibre jacket and an adjacent portion with a fibre jacket;

placing the package, optical fibre and bezel into a mould cavity, the mould cavity including an insert seat on which the snout bore is located, thereby facilitating mould material flow and mould chamber sealing;

injecting a first material into the mould to form a first moulded jacket, said first moulded jacket surrounding the sheathed portion of optical fibre stripped of a fibre jacket and affixed to: the fibre jacket encasing the adjacent portion of optical fibre, the snout bore, and a ferrule located within the snout bore; and, injecting a second material into the mould to form a second moulded jacket, said second moulded jacket surrounding and affixed to the first moulded jacket, a portion of the fibre jacket and the snout bore.

Since the first stage seals the optical fibre, the strain relief can then be fabricated outside a fibre shop. A predetermined minimum fibre optic radius can be designed into the polymer relief structure.

The method may further comprise the step of curing the first material by a polymerisation process. The first material is preferably a quick-curing epoxy compound. In which case, the epoxy compound may advantageously be cured at low temperature.

The second material is conveniently a thermoplastic elastomer.

The method may further comprise the step of pulling a rubber boot over the second moulded jacket.

The packaged optical device connected by the strain relief interface may comprise a butterfly packaged optical device.

DETAILED DESCRIPTION OF THE INVENTION

The present invention discloses a method for fabricating a fibre to casing interface that reduces component cost, assembly cost and cost of device failures during assembly. The method calls for the reduction of the ferrule external to the casing snout.

The interface between a fibre 102,112,114 and a casing 118 is manufactured in two stages: first pre-assembling the fibre and a ferrule 108; and then using the casing and the pre-assembled fibre as "mould inserts". In the first stage, a pre-cured polymer stiffener 110 is used to secure the fibre cladding 102, fibre sheath 114 and ferrule 108 to the fibre jacket 112. In the second stage, a thermo-plastic elastomer outer mould 116 is used to mould a strain relief interface around the first stage interface 110.

In order to effect the two stage mould process, a mould cavity is provided to hold the fibre 102,112,114 and case 118 as a composite insert. The casing and mould interface is arranged with a mould insert seat to facilitate mould material flow and mould chamber seal. The fibre harness 112, a short portion of the stripped cladding 102,114 and the snout area 120 of the casing are held over a bezel and placed rigidly in the mould to ensure that the fibre is axially straight for functional integrity. The bezel is constructed to generate the flex and strength demands of a moulded strain relief run length.

The moulding process calls for a two stage material fabrication. The first material coats a pre-charge of quick curing mould epoxy compound 110 to fix the fibre 102,112, 114 and the casing 118 interface seal zones. This can be performed with or without cavity fixturing. When the first material has substantially cured, the butterfly casing is placed in a mould cavity (which may the same cavity as was used for cavity fixture in the first stage) and a second charge of thermoplastic elastomer 116 is injected. This second charge is the main compound to establish the interface strain relief run length and the volume mass to generate the snout-casing interface. The coat epoxy 110 and elastomer 116 moulded compounds serve to protect the fibre core 102, stripped cladding 114 and they bond the outer fibre harness jacket 112 rigidly to the snout interface 120. At the same time, they provide good strain relief run length to avoid fibre kink and small radius failure modes. Upon final mould cure, the butterfly casing 118, together with the now integral fibre harness strand 112 is removed from the moulding machine.

FIG. 1 shows the completed configuration of the interface. The fibre is stripped to expose the core and cladding layers 102 in a first portion at a distal end of the fibre. A second portion of the fibre, adjacent to the first portion, is stripped to expose the sheath 114, which normally encases the core and cladding layers 102. A third portion of the fibre, adjacent to the second portion, is not stripped and exposes only the outer jacket or harness 112. A ferrule 108 is provided with a central, passageway arranged to receive the core 102 of the fibre, the diameter of the passageway being substantially the same as the core. The outer diameter of the ferrule 108 is substantially the same as the diameter of a port provided in a snout section 120 of the butterfly package casing 118.

The ferrule, fibre and casing are held in place by a pre-cured epoxy/mould compound 110. A further TPE outer strain relief mould compound 116 encases the snout section 120, the pre-cured epoxy 110 and the outer jacket 112 of the fibre.

The interface ensures that the core and cladding layers 102 of the fibre are optically coupled with the optical device 104 in the casing. Once the optical fibre is fixed in place, the casing 118 can be sealed off by closing a casing cover 106.

The aesthetic demands of the product may require that a fibre boot (not shown) be pulled over the moulded snout interface 100. Additionally, the hermetic sealing demands of the assembly would require specific optimised material characteristics in the moulded strain relief. In some applications where the snout size is larger by proportion, the moulded strain relief may not provide the stiffness strength needed. A supplementary fibre boot over the moulded jacket will enhance the stiffness of the moulded strain relief.

What is claimed is:

1. A strain relief interface for connecting a packaged optical device and an optical fibre, the optical fibre passing through a snout bore extending from a side wall of the package, comprising:

a first moulded jacket, said first moulded jacket surrounding and affixed to a sheathed section of optical fibre from which a fibre jacket has been removed, a first end of the list moulded jacket affixed to a fibre jacket encasing an adjacent section of optical fibre, a second and of tho first moulded jackal affixed to the snout bore end to a ferrule located within the snout bore; and, a second moulded jacket, said second moulded surrounding and affixed to the first moulded jacket, a portion of the fibre jacket, end the snout bore.

2. A strain relief interface according to claim 1, in which the first moulded jacket comprises a quick-curing epoxy compound.

3. A strain relief interface according to claim 2, in which the epoxy compound has a similar coefficient of thermal expansion to the optical fibre.

4. A strain relief interface according to any preceding claim, in which the second moulded jacket comprises a thermoplastic elastomer.

5. A strain relief interface according to any preceding claim, in which an outer surface of the second moulded jacket is ridged to provide strain relief.

6. A strain relief interface according to any preceding claim, further comprising a rubber boot pulled over the second moulded jacket.

7. A strain relief interface according to any preceding claim, wherein the packaged optical device is a butterfly packaged optical device.

8. A method for fabricating a strain relief interface that connects a packaged optical device and an optic fibre, the optical fibre passing through a snout bore extending from a side wall of the package, comprising the steps of:

locating over a bezel a sheathed section of optical fibre adjacent the snout bore, said sheathed section comprising a portion stripped of a fibre jacket and an adjacent portion with a fibre jacket;

placing the package, optical fibre and bezel into a mould cavity, the mould cavity including an insert seal on which the snout bore is located, thereby facilitating mould material flow and mould chamber sealing;

injecting a first material into the mould to form a list moulded jacket, said first moulded jacket surrounding the sheathed portion of optical fibre stripped of a fibre jacket and affixed to: the fibre jacket encasing the adjacent portion of optical fibre, the snout bore, and a ferrule located within the snout bore; and, injecting a second material into the mould to form a second moulded jacket, said second moulded jacket surrounding and affixed to the first moulded jacket, a portion of the fibre jacket and the snout bore.

9. A method according to claim 8, further comprising the step of curing the first material by a polymerisation process.

10. A method according to claim 8 or 9. In which the first material is a quick-curing epoxy compound.

11. A method according to claim 10, in which the epoxy compound is cured at low temperature.

12. A method according to any ot claims 8 to 11, in which the second material is a thermoplastic elastomer.

13. A method according to any of claims 8 to 12, further comprising the step of pulling a rubber boot over the second moulded jacket.

14. A method according to any of claims 8 to 13, in which the packaged optical device comprises a butterfly packaged optical device.

15. A method for fabricating a strain relief interface that connects a packaged optical device and an optical fitter comprising:

locating over a bezel, a sheathed section of optical fiber adjacent to a snout bore;

placing a package, the optical fiber, and the bezel into a mold cavity; injecting a first material into the mold to form a first molded jacket; and injecting a second material into the mold to form a second molded jacket.

16. The method according to claim 15, wherein said sheathed section of optical fiber comprises, a portion of a fiber jacket and an adjacent portion with a fiber jacket.

17. The method according to claim 15, wherein the mold cavity includes an insert seat on which the snout bore is located.

18. The method according to claim 15, wherein said first molded jacket surrounds the sheathed portion of the optical fiber stripped of a fiber jacket and affixed to: the fiber jacket encasing the adjacent portion of the optical fiber, the snout bore, and a ferrule located within the snout bore.

19. The method according to claim 15, wherein said second molded jacket surrounds and is affixed to the first molded jacket, and a portion of the fiber jacket and the snout bore.

* * * * *